June 24, 1930. C. W. STEELE 1,766,727
COMPOUND TOOL
Filed Oct. 8, 1928 2 Sheets-Sheet 1
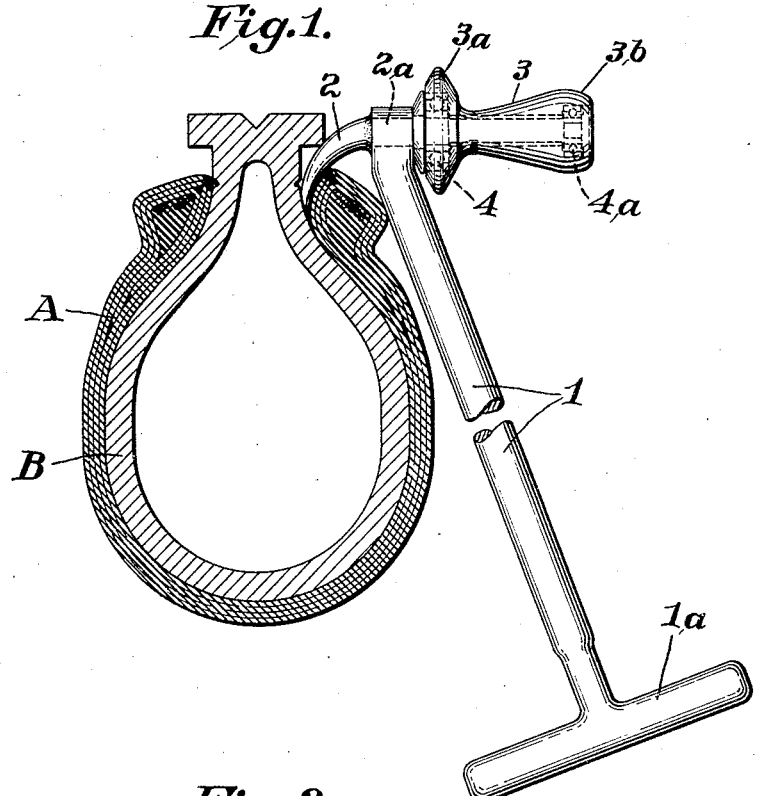
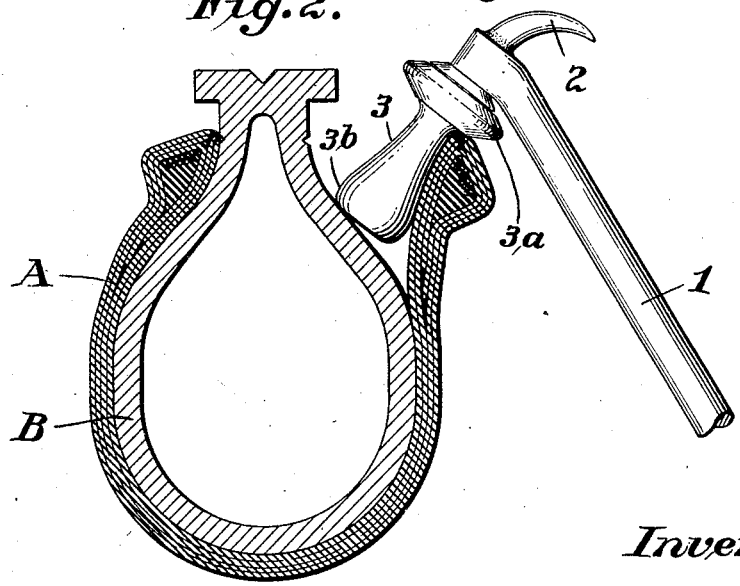
Inventor:
Charles W. Steele,
by Spear Middleton Donaldson & Hall
Attys.

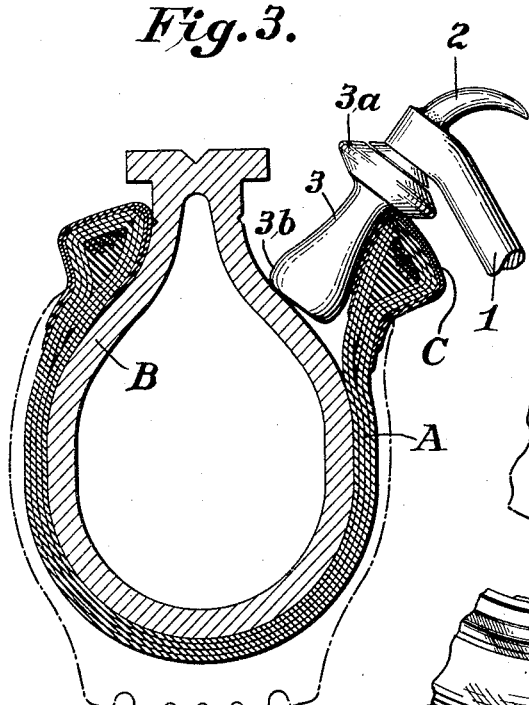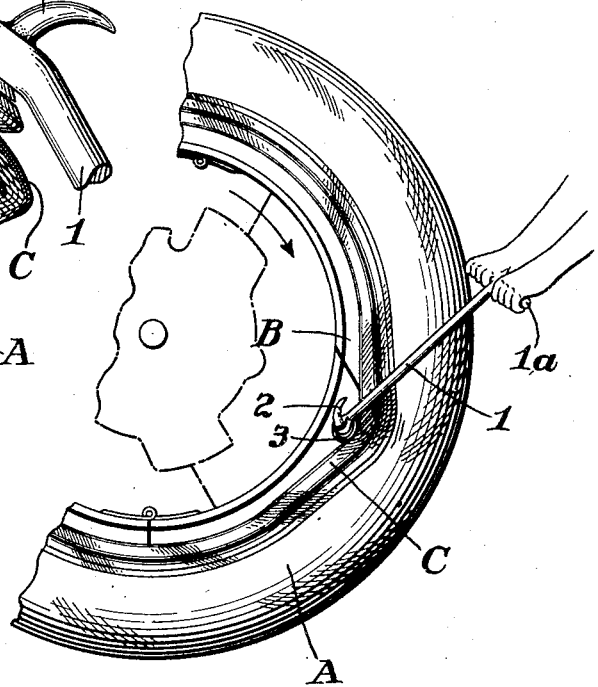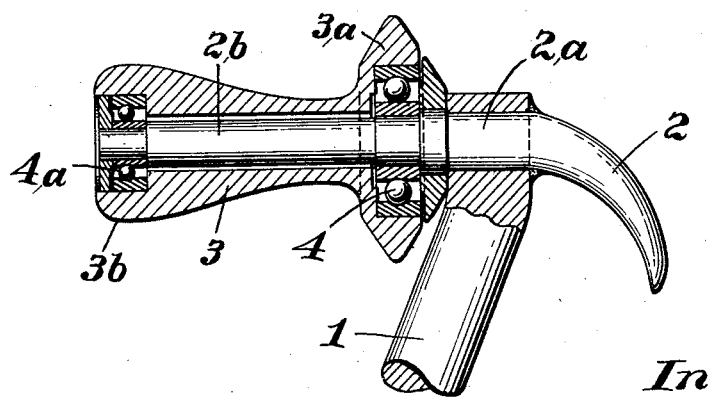

Patented June 24, 1930

1,766,727

UNITED STATES PATENT OFFICE

CHARLES W. STEELE, OF AKRON, OHIO, ASSIGNOR TO THE MILLER RUBBER COMPANY, OF AKRON, OHIO, A CORPORATION OF OHIO

COMPOUND TOOL

Application filed October 8, 1928. Serial No. 311,087.

My said invention concerns an improved tool or device designed to facilitate the application of the bead covering strips which are applied around the bead portions of the tire carcasses with the margins of the strips lying respectively on the inner and outer faces of the tire adjacent the beads.

In the modern system of building tires, it is customary to have the tire machine equipped with a quick collapsing core, the parts of which are all hinged together, and permanently fastened to the tire building machine so that the tires after being finished are entirely removed from the core to be afterwards cured on air or water bags. In the building of such tires, plies of cord fabric are first stitched over the core, then the beads which are enclosed in flipper strips which extend up into the wall of the carcass, are placed in position and other plies of cord fabric are stitched over the beads and the fabric is trimmed at the toe of the bead. A bead cover is then applied. This consists of one or more layers of fine, square-woven fabric which extends an inch or so above the bead on the outside of the tire and about half or three-quarters of an inch up the tire on the inside of the carcass.

The invention aims to provide a simple and economical device by which the beaded edges of the tire may be quickly and easily loosened from the core and the covering strips readily and smoothly applied, and the invention comprises the novel construction hereinafter described and defined by the appended claims.

In order that the invention may be fully understood, reference is made to the accompanying drawings in which:

Figure 1 is a view showing a core and tire carcass in cross section with the tool (shown partly away), illustrated as used to first pry the beaded edge from the core.

Fig. 2 is a similar view, showing how the roller portion of the tool is used to complete the separation of the beaded edge.

Fig. 3 is a similar view illustrating the said roller end in the position assumed in applying the covering strip.

Fig. 4 is a view showing a portion of the tire and core in side elevation with the core chuck indicated conventionally by dotted lines and the tool in position relative to the hands of the operator and Fig. 5 is a sectional detail of the tool or device.

The device comprises a shank 1 having a suitable pulling handle such as a T head indicated at 1ª carrying at the opposite end a rigid pointed projection 2 and in spaced relation thereto, a rounded knob 3.

Preferably the pointed projection is of substantially hook shape as shown.

The knob 3 is rotatably mounted to give rolling contact with the tire and covering strip when used in the manner hereinafter described and is provided with an annular flange 3ª to contact with the toe of the bead, (or tire edge), and the knob portion is flared outwardly from the base of said flange and terminates in a rounded end indicated at 3ᵇ.

Preferably the hook 2 has an integral part passing through a transverse opening in the end of the shank as indicated at 2ª, in which opening it is rigidly secured, as by brazing or welding, and is provided with an extension 2ᵇ, which enters an axial bore in the knob and forms a stub shaft on which the knob is rotatably mounted by means of inner and outer roller bearings counter sunk in the ends of the knob as indicated at 4 and 4ª, respectively.

The end of the shank is disposed at a slight angle to the main body so that the stub shaft lies at an acute angle (or one less than 90°), to the shank.

In the use of this device, after the outer layers of fabric have been stitched down over the beads and they are thus ready for application of the covering strips, the operator inserts the projection 2 under one edge of the tire A as shown in Fig. 1 and pries the bead portion loose from core B for approximately a foot around the tire. He then inserts the knob end under the loosened edge as shown in Fig. 2 and starts the core to rotating at slow speed, at the same time holding on to the T handle as shown in Fig. 4, which causes the knob to roll around between the tire edge and core and pull the bead and side wall loose from the core. The bead covering strip C is then applied to the bead by first applying the edge nearest the tread of the tire and then smoothing it down towards the toe of the bead by means such as a swab dipped in gasoline. Thereafter, the projecting marginal portion of the strip at one point is folded up around the toe so as to lie against the inside face of the tire, the knob inserted as in Fig. 3 and by again starting the core to rotating and holding the tool as above described, the knob with its flange causes the strip to be quickly and smoothly stitched around the toe of the bead and up the inside of the tire.

The operation is repeated for the other bead, when the carcass is ready for removal from the core, after application of the tread strip in the customary manner.

Having thus described my invention, what is claimed is:

1. A compound tool for the purpose described comprising a suitable handle having at the end thereof a hook and a rotatable knob extending in different directions.

2. A compound tool for the purpose described comprising a handle shank having a curved pointed member rigidly carried at one side thereof and a rounded knob at the opposite side.

3. A compound tool for the purpose described comprising a handle shank having a curved pointed projection rigidly carried at one side of the end thereof and a knob rotatably carried by said end and spaced from said projection.

4. A compound tool comprising a shank carrying a suitable handle, a prying projection rigidly carried at the end thereof, and a roller knob rotatably carried by said end in spaced relation to said projection.

5. The device of claim 4 in which the knob is increased in diameter towards its outer end.

6. The device of claim 4 in which the knob has an annular flange or rib adjacent the shank and is tapered or flared outwardly from the base of the rib towards its outer end.

7. The device of claim 4 in which the axis of rotation of the knob is disposed at an acute angle to the shank.

In testimony whereof, I affix my signature.

CHARLES W. STEELE.